United States Patent [19]
Mehnert

[11] 3,924,987
[45] Dec. 9, 1975

[54] ARTICULATED MOLD OPENING AND CLOSING MEANS FOR USE IN BLOW MOLDING APPARATUS

[76] Inventor: Gottfried Mehnert, Messelstr. 25, Berlin 33, Germany

[22] Filed: Nov. 30, 1973

[21] Appl. No.: 420,707

[30] Foreign Application Priority Data
Dec. 7, 1972   Germany............................ 7244857

[52] U.S. Cl..................... 425/451.5; 425/DIG. 205
[51] Int. Cl.².......................... B29F 3/00; B29C 1/16
[58] Field of Search.......... 425/DIG. 205, DIG. 206, 425/DIG. 212, 450.1, 451.5

[56] References Cited
UNITED STATES PATENTS

| | | | |
|---|---|---|---|
| 3,277,534 | 10/1966 | McDonald et al. | 425/DIG. 205 |
| 3,334,380 | 8/1967 | Settembrini | 425/DIG. 205 |
| 3,402,431 | 9/1968 | Fogelberg et al. | 425/DIG. 205 |
| 3,449,481 | 6/1969 | Tahara | 425/DIG. 205 |
| 3,734,671 | 5/1973 | Talasz | 425/DIG. 205 |
| 3,776,680 | 12/1973 | Saffron | 425/DIG. 206 |
| 3,782,879 | 1/1974 | Mnilk et al. | 425/DIG. 205 |
| 3,785,761 | 1/1974 | Logomasini et al. | 425/DIG. 205 |
| 3,807,929 | 4/1974 | Moore | 425/DIG. 205 |

Primary Examiner—Francis S. Husar
Assistant Examiner—Carl Rowold
Attorney, Agent, or Firm—Michael S. Striker

[57] ABSTRACT

An open-and-shut mold for use in blow molding machines wherein the mold sections or their platens are articulately connected to plate-like closing members which are movable toward and away from each other to thereby close or open the mold. The articulate connections include rams which are rigid with the central portions of the mold sections or with the corresponding portions of the platens and are secured to the respective closing members by means of horizontal pivots or universal joints. The mold sections are guided by two tie rods which are located at a level below the mold sections and are spaced apart so that the distance between the tie rods exceeds the width of the mold sections. Helical springs, dished springs or other suitable biasing means are provided between the closing members and the respective platens or mold sections to maintain the open sides of the mold sections in parallelism with each other as soon as the mold begins to open even if the closing members are tilted or tilted and distorted during the application of sealing and clamping forces.

15 Claims, 4 Drawing Figures

ARTICULATED MOLD OPENING AND CLOSING MEANS FOR USE IN BLOW MOLDING APPARATUS

BACKGROUND OF THE INVENTION

The present invention relates to open-and-shut molds in general, and more particularly to improvements in open-and-shut molds of the type which can be used with advantage in blow molding machines wherein a parison (either a bubble, a tube or one or more strips) consisting of synthetic plastic material is expanded to be thereby converted into a hollow shaped article. Typical examples of such articles are bottles, vials, cans and/or other types of receptacles for viscous or readily flowing liquids, tablets, pills, granules or the like.

As a rule, the open-and-shut mold of a blow molding machine comprises two mold sections which define one or more mold cavities when the mold is closed and which are movable relative to each other by hydraulic, pneumatic or otherwise powered motors to move their open sides into and from abutment with each other. The mold sections are mounted on suitable platens or directly on closing members which are movable along or with elongated parallel tie rods serving to insure that the mold sections remain parallel to each other. Such molds are used in machines wherein parisons are expanded in response to introduction of a compressed gaseous blowing medium (e.g., by resorting to a blowing mandrel or needle) as well as in machines wherein the expansion of parisons in the mold cavities takes place in response to evacuation of air from the mold cavities around the parisons. All such machines are normally called blow molding machines in spite of the fact that no actual blowing takes place when expansion of parisons is effected by suction.

The mold sections are bolted or otherwise secured to discrete platens if the blow molding machine is designed for the making of different types of hollow shaped articles, i.e., if the mold sections must be replaced at times by different mold sections. The platens are rigid with preferably plate-like closing and sealing or clamping members which are coupled to means for reciprocating the mold sections with and relative to the tie rods. It is also known to omit the platens and to attach the mold sections directly to the closing members or to omit the closing members and employ the platens as a closing means for moving the mold sections as well as for applying a closing and clamping force during expansion of parisons in the mold cavity or cavities.

Nearly all recently developed blow molding machines are designed for a multi-stage operation which contributes to higher output and often produces hollow shaped articles of superior quality. Thus, a blow molding machine may be provided with an extruder whose nozzle or nozzles extrude one or more parisons on a continuous basis, and one or more open-and-shut molds which receive parisons from the nozzle or nozzles and transport them into register with one or more blowing units where the parisons are expanded, either in a single step or in two or more successive steps. It is also known to move the blowing unit or units into and from register with the mold or molds. The following description of the invention will deal with molds which are assumed to move into and from register with stationary blowing units, with the understanding, however, that the improved molds can be used with equal advantage in blow molding machines with mobile blowing units.

When a blow molding machine employs a single extrusion machine, a single blowing unit and a displaceable open-and-shut mold, the mold is opened on its way toward the extrusion machine so that its sections flank a freshly extruded parison, the mold is thereupon closed to confine the parison in the cavity and to separate the parison from the leader of the next-following parison, the mold is then transferred to the blowing station where the parison is expanded, the mold thereupon opens to allow for evacuation or ejection of the shaped article, and the mold then returns to the extrusion machine. The latter produces a fresh parison not later than or shortly after the open mold returns to the extruding station so that the procedure can begin anew.

In accordance with another known method, the mold cooperates with a first blowing unit to produce a semifinished article which is thereupon transferred into a second mold and the second mold cooperates with the same blowing unit or with a second blowing unit to complete the conversion of the parison into a finished bottle or the like whose configuration and dimensions match exactly a predetermined norm.

The mold sections are guide by tie rods whenever the mechanism which closes the mold is designed to exert pressure against one closing member while simultaneously exerting a pull on the other closing member so that the mold sections travel toward each other and meet in a predetermined plane in accurate register with the nozzle or noz-zles at the extruding station. As a rule, the mechanism for moving the closing members toward and away from each other so that one of the closing members is pushed while the other closing member is pulled, or vice versa, employs one or more fluid-operated motors, especially double-acting hydraulic cylinder and piston units. For example, one of the closing members may be rigidly secured to the ends of tie rods and the other closing member is slidable along the tie rods. In order to insure accurate guidance of mold sections and to thus insure that the open sides of the mold sections remain parallel to each other, many presently known blow molding machines employ molds with four tie rods, one at each of the four corners or a rectangular plate-like closing member. This presents many problems, especially when the mold is to be moved into and from register with the nozzle or nozzles at the extruding station. Thus, at least one of the tie rods would strike against a parison which is being continuously extruded from a nozzle so that the extrusion of parison must be interrupted which, however, is highly undesirable. The operation of a blow molding machine is most economical if the parison is being extruded continuously. The contact between one or more tie rods and a growing parison can be avoided only if the mold is moved up and down which is not desirable in most instances because it contributes excessively to the height of the blow molding machine; as a rule, the manufacturer prefers to move the mold along a horizontal path or along a path which is slightly inclined with respect to a horizontal plane. The path may be straight, arcuate or a combination of both.

Attempts to avoid contact between one or more tie rods and a growing parison during movement of the mold along a substantially horizontal path toward the extruding station include the provision of open-and-shut molds whose sections are guided by three tie rods, i.e., without that (upper) tie rod which would strike against the growing parison while the open mold approaches a position of register with one or more extruding nozzles. It was also proposed to mount the mold sections on two tie rods which are located diagonally opposite each other, i.e., one at the upper left- or right-hand corners of the mold sections and the other at the lower right- or left-hand corners of the mold sections. Such molds are more satisfactory because the tie rods do not interfere with continuous extrusion of parisons; however, the application of substantial closing, sealing and locking forces to the mold sections (and more particularly to the platens or closing members) often results in misalignment of the mold sections so that the plasticized material can escape from the mold cavity. This necessitates removal of webs of hardened plastic material from the finished articles or can affect the quality and/or appearance of such articles. Moreover, when the mold sections are guided by two tie rods which are located diametrically opposite each other, the mold must be moved in a single predetermined direction toward and away from register with the extrusion machine because, otherwise, the upper tie rod would strike against a growing parison. Thus, even such construction are not entirely satisfactory, not only because of unsatisfactory alignment of mold sections in response to the application of substantial sealing and locking forces against the closing members while the mold is closed but also because the designer does not have sufficient freedom to install the various components of the blow molding machine in a manner to insure an optimum utilization of the available space.

SUMMARY OF THE INVENTION

An object of the invention is to provide an open-and-shut mold, especially for use in blow molding machines, which is constructed and assembled in such a way that it can be moved relative to the extruding and/or blowing station or stations in any desired direction, or vice versa, without interfering with continuous extrusion or parisons and without affecting the accuracy of alignment of mold sections when the mold is closed and the sections are subjected to the action of requisite closing, sealing and clamping forces.

Another object of the invention is to provide an open-and-shut mold wherein the mold sections can remain properly aligned with each other during each stage of movement and in each condition of the mold even though the mold sections need not be guided by more than two tie rods.

A further object of the invention is to provide an open-and-shut mold wherein the mold sections are more readily accessible for inspection, removal of remnants of hardened synthetic plastic material and/or detachment from the platens and/or closing members than in heretofore known molds.

An additional object of the invention is to provide an open-and-shut mold with novel and improved devices for connecting the mold sections with the means which moves the sections toward and away from engagement with each other.

Still another object of the invention is to provide a mold which can be used with equal advantage for the conversion of parisons into partially finished or completely finished hollow shaped articles and which is capable of cooperating with blowing or analogous instrumentalities to produce hollow shaped articles with a degree of reproducibility which is at least as satisfactory as that in presently known molds.

A further object of the invention is to provide a mold which is constructed and assembled in such a way that its cavity can receive a parison at one side and permit for removal of a finished or semifinished article at the other side thereof without any interference on the part of tie rods on or with which the mold sections are movable toward or away from each other, irrespective of whether the parisons are transported toward the mold or vice versa, and irrespective of whether the articles which are being shaped in the mold must be evacuated sideways, for example, to be transferred into a second mold for further expansion and conversion into finished products.

The invention is embodied in an open-and-shut mold which is especially suited for use in blow molding machines. The mold comprises two mold sections having open sides which face each other and each of which is formed with a portion of at least one mold cavity, a preferably plate-like closing member for each mold section, means for moving at least one of the closing members to thereby shift the respective mold section between first and second positions in which the open sides of the mold sections respectively abut and are spaced apart from each toher, and preferably horizontal parallel tie rods for the closing members. In accordance with a feature of the invention, all of the tie rods are posed at a level below the mold sections, i.e., at such a level that they are located below the lower end of a fully grown parison at the extruding station of a blow molding machine or below the lower end of a partially or completely finished hollow shaped article in the cavity of the mold.

If the mold includes two tie rods, they are preferably spaced apart from each other in such a way that they flank the mold sections, i.e, that the mold sections are located in the space between (but above) the tie rods. The mold sections may be mounted directly on the respective closing members or the mold may comprise a pair of platens each of which is located between a closing member and the respective mold section and is rigidly but preferably separably secured to the respective mold section. The axes of the tie rods may be located in a common horizontal plane or the tie rods may be located at different levels.

In accordance with another feature of the invention, the mold further comprises means for articulately connecting the closing members to the respective mold sections or to the respective platens. Such means for articulately connecting may comprise pivots whose axes are normal to the axes of the tie rods or universal joints which allow the mold sections to move in a plurality of directions with respect to the corresponding closing members. For example, each mold section or platen may be made rigid with a projection or ram which extends with clearance through an opening in the respective closing member, and a horizontal pivot may connect eachram to a bracket or another suitable support at that side of the respective closing member which faces away from the mold sections.

In accordance with still another feature of the invention, the mold may comprise biasing means which is interposed between each closing member and the respective mold section or platen. If the aforementioned rams are connected to or made integral with the central portions of the respective mold sections or platens, the biasing means may comprise a helical spring, a package or dished springs, a shock absorber, a gas-filled bellow or the like at a level below and/or above each of the rams. The purpose of the biasing means is to maintain the open sides of the mold sections in parallelism with each other as soon as the open sides are slightly separated.

The tie rods may extend through sleeves provided therefor in enlarged lower end portions of the closing members. One of the closing members may be rigid with the tie rods and the other closing member may be slidably mounted on the tie rods. The means for moving may comprise a first fluid-operated motor which can reciprocate the tie rods with the one closing member and the respective mold section so that the latter moves toward or away from the other mold section, and a second fluid-operated motor which can move the other closing member and the respective mold section so that the latter moves toward or away from the mold section on the closing member. The movements of the two motors are preferably synchronized so that the open sides of the mold sections meet in a predetermined plane when the mold is closed and are located at identical distances from such plane when the mold is open.

The novel features which are considered as characteristic for the invention are set forth in particular in the appended claims. The improved mold itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
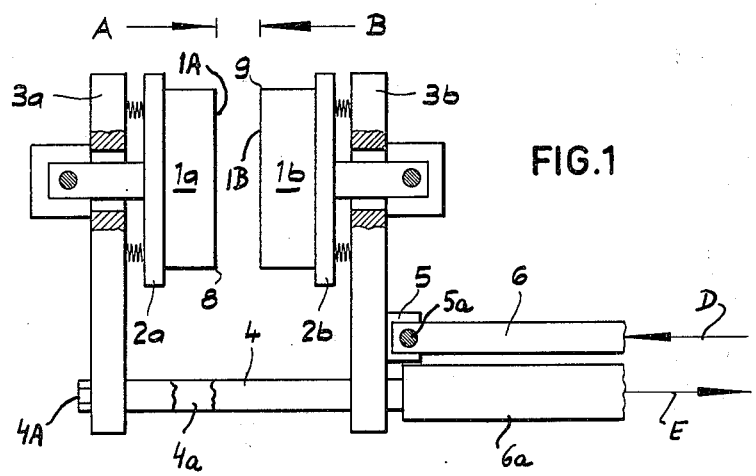
FIG. 1 is a fragmentary side elevational view of an open-and-shut mold which embodies one form of the invention and is shown in open position.
Figure 2:
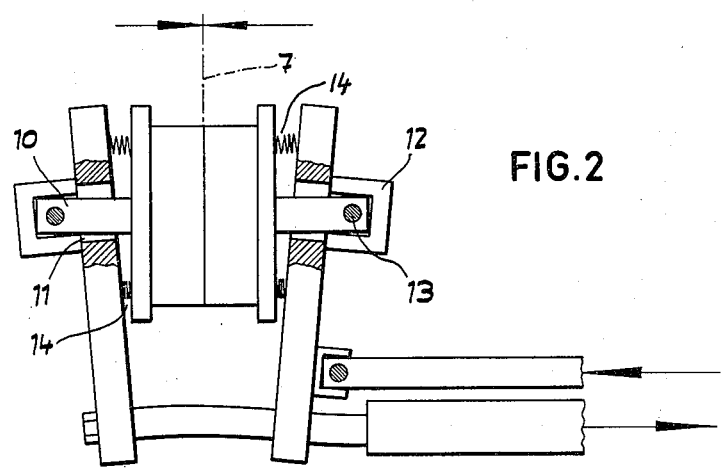
FIG. 2 is a similar side elevational view but showing the mold in closed position.

Referring first to FIGS. 1 and 2, there is shown an open-and-shut mold which can be utilized in a blow molding machine for conversion of parisons into partly finished hollow shaped articles or into conversion of parisons into finished articles in the form of bottles, cans or the like. The mold comprises two mold sections or halves $1a$ and $1b$ having parallel open sides $1A$, $1B$ each of which has a recess defining a portion of a mold cavity for reception and expansion of a parison. When the mold is closed in a manner as shown in FIG. 2, the open sides $1A$, $1B$ of the sections $1a$, $1b$ abut against each other in the plane 7 so that the parison can be expanded, either by resorting to a blowing mandrel or needle or by evacuating air in the cavity around the parison. The sections $1a$, $1b$ are respectively bolted or otherwise separably but rigidly secured to platens $2a$, $2b$ which, in turn, are supported by plate-like upright closing and clamping members $3a$, $3b$. The closing and clamping members $3a$, $3b$ (hereinafter called closing members for short) are respectively reciprocable with and along two parallel horizontal tie rods 4, $4a$ which are located at a level below the mold sections $1a$, $1b$ and platens $2a$, $2b$. The axes of the tie rods 4, $4a$ are assumed to be located in a common horizontal plane and these tie rods are spaced apart from each other so that the sections $1a$, $1b$ are disposed in the space therebetween. The left-hand end portions of the tie rods 4, $4a$ are rigidly secured to the lower portion of the closing member $3a$ by bolts, nuts or analogous fasteners 4A. The lower portion of the closing-plate $3b$ has openings (not shown) wherein the tie rods 4, $4a$ are slidable lengthwise or vice versa.

The mechanism for moving the tie rods 4, $4a$ with the closing member $3a$ in and counter to the direction indicated by arrow A includes one or more rods $6a$ forming part of suitable motors (e.g., hydraulically operated cylinder and piston units). The mechanism for moving the closing member $3b$ relative to the tie rods 4, $4a$ in and counter to the direction indicated by arrow B comprises one or more rods 6 forming part of suitable motors, e.g., hydraulically operated cylinder and piston units. The illustrated rod 6 is articulately connected with the lower portion of the closing member $3b$ by means of a transversely extending coupling pin $5a$ which extends through a projection of lug 5 of the closing member $3b$. The lug 5 may be mounted on or made integral with the closing member $3b$ intermediate the tie rods 4, $4a$. The movements of the two mechanisms are synchronized in a manner well known from the art and not forming part of the present invention. It suffices to say that the rod 6 pushes the parts $1b$, $2b$, $3b$ in a direction to the left, as viewed in FIG. 1, while the rod $6a$ pulls the tie rods 4, $4a$ and the parts $1a$, $2a$, $3a$ in a direction to the right, or vice versa, so that the mold sections $1a$, $1b$ can meet in the plane 7 of FIG. 2 when the mold is closed and that the sections $1a$, $1b$ are spaced apart in a manner as shown in FIG. 1 when the mold is open. A suitable synchronizing system is disclosed, for example, in German Utility Model No. 1,937,084.

When the mold sections $1a$, $1b$ respectively move in the directions indicated by arrows A and B, their open sides $1A$, $1B$ meet face-to-face in the plane 7 as soon as the mold is closed but the sections $1a$ $1b$ are not as yet subjected to the action of a sealing force which prevents the escape of plastic material in the plane 7 during expansion of a parison in the mold cavity. In order that the sections $1a$, $1b$ meet face-to-face in the plane 7, it is assumed that the platens $2a$, $2b$ are exactly parallel to each other and that the open sides $1A$, $1B$ of the sections $1a$, $1b$ are also exactly parallel to each other. As the rod $6a$ continues to pull the tie rods 4, $4a$ in the direction of arrow A and the rod 6 continues to push the closing member $3b$ in the direction indicated by arrow B, the closing members $3a$, $3b$ tend to pivot in a manner as shown greatly exaggerated in FIG. 2. Thus, and assuming that the closing members $3a$, $3b$ were respectively rigid with the platens $2a$, $2b$ (and hence with the mold sections $1a$, $1b$), the upper edges 9 of the mold sections $1a$, $1b$ would tend to move apart and the lower edges 8 would bear against each other with an extremely great force. Consequently, the plastic material of a parison in the mold cavity would penetrate into the gap between the mold sections $1a$, $1b$ in closed position of the mold. Some tilting of the mold sections $1a$, $1b$ about their lower edges 8 would occur even if the tie rods 4, $4a$ were overdimensioned and even if the closing member $3b$ were slidably mounted on the tie rods with negligible clearance. The formation of a gap between the mold sections $1a$, $1b$ during expansion of a parison is highly undesirable for obvious reasons; at the very least, the material which penetrates into the gap affects the appearance of the hollow shaped article.

The gap is particularly undesirable when the parison is a tube which is to be expanded into a bottle or the like; in the making of such articles, the lower portions of the mold sections serve to close the lower end of a freshly extruded extruded parison and to pinch off the surplus plastic material while a blowing mandrel penetrates into the upper end of the parison and cooperates with the adjacent upper portions of the mold sections to shape and calibrate the neck portion of the bottle. The presence of flashes or webs of plastic material on the neck portion of a blow molded plastic bottle is undesirable because the neck portion is often formed with external threads to take an internally threaded cap or the like. Also, such neck portion cannot be formed with a smooth top end face to insure satisfactory sealing of volatile or other flowable ingredients. If the closing members are mounted in a manner as shown in FIGS. 1 and 2 (i.e., for movement with and along two tie rods which are located at a level below the mold sections) and if the platens 2a, 2b and sections 1a, 1b were rigid with the closing members 3a, 3b, the width of the gap between the open sides 1A, 1B of the mold sections would increase from the lower toward the upper end of the mold cavity so that the gap would reach a maximum width in the region of the neck portion of a bottle or the like, i.e., in the very region where accurate dimensioning of the hollow shaped article is of utmost importance.

In accordance with a feature of the present invention, the mold comprises means for articulately connecting the platens 2a, 2b to the respective closing members 3a, 3b in such a way that each of the closing members is movable with respect to the associated platen about at least one axis. In the embodiment of FIGS. 1 and 2, the closing members 3a, 3b are pivotable with respect to the platens 2a, 2b about horizontal axes which are normal to the axes of the tie rods 4, 4a and are located at the level of the central portions of the mold sections 1a, 1b. To this end, the outer sides of the closing members 3a, 3b are provided with brackets or supports 12 for horizontal pivot members 13 which are further connected to push rods or rams 10 rigid with the central portions of the respective platens. The rams 10 pass with clearance through openings 11 provided therefor in the respective closing members 3a, 3b so that the closing members are free to tilt or pivot with respect to the adjacent platens while the rods 6, 6a continue to apply forces in directions indicated in FIG. 1 by arrow D and E. Since the rams 10 are connected to the central portions of the respective platens (and thus act against the central portions of the respective mold sections), the mold sections do not tend to tilt about the edges 8 even if the rods 6, 6a apply to the closing members 3a, 3b a substantial closing and locking force after the open sides 1A, 1B of the mold sections 1a, 1b have moved into actual contact with each other.

The mold of FIGS. 1 and 2 further comprises biasing means 14 which are interposed between the platens 2a, 2b and the closing members 3a, 3b. In the illustrated embodiment, the biasing means are helical springs which are installed at levels above and below the respective rams 10 and whose function is to restore the platens 2a, 2b to the upright positions shown in FIG. 1 as soon as the magnitude of the forces acting in directions indicated by arrows D and E decreases sufficiently to insure that the closing members 3a, 3b return into planes which are parallel to the plane 7 and as soon as the open sides 1A, 1B are caused to move away from each other. In many instances, the upper springs 14 can be omitted, provided that the lower springs 14 are capable of restoring the platens 2a, 2b to the positions shown in FIG. 1, in which the open sides 1A, 1B of the mold sections 1a, 1b are exactly parallel to each other, at least when the mold sections 1a, 1b are not in actual contact with each other. If the mold uses at least two springs 14 between each closing member and the respective platen, the lower springs 14 store energy due to compression and the upper springs 14 store energy due to expansion whenever the closing members 3a, 3b begin to tilt in a manner as shown, greatly exaggerated, in FIG. 2. The springs 14 can further serve as a means for opposing at least some of the forces which tend to tilt the closing members 3a, 3b when the application of forces acting in the directions indicated by arrows D and E continues after the open sides 1A, 1B of the sections 1a, 1b reach the plane 7.

It has been found that the mold of FIGS. 1 and 2 can maintain the entire open sides 1A, 1B of the mold sections 1a, 1b in contact with each other irrespective of the extent of tilting of the closing members 3a, 3b, and this is attributed to the provision of means 10–13 for articulately connecting the closing members with the respective platens. The positions of the mold sections 1a, 1b in closed and locked position of the mold are particularly satisfactory if the rams 10 are mounted to act against the central portions of the mold sections; however, the results are quite satisfactory even if the rams 10 are mounted off center because they transmit to the platens 2a, 2b forces which are normal to the plane 7 even if they are mounted further away from or nearer to the tie rods 4, 4a than shown in FIGS. 1 and 2.

The platens 2a, 2b constitute an optional feature of the improved mold. Such platens are used when the mold is to employ two or more pairs of interchangeable mold sections. However, if the mold is designed for the making of a single type of hollow shaped articles, the platens 2a, 2b can be omitted and the rams 10 can be connected directly to the respective mold sections 1a, 1b. Furthermore, and even if the mold is to be used with two or more pairs of mold sections, different pairs of mold sections can be articulately connected directly to the closing members 3a, 3b so that in such molds, too, the platens 2a and 2b can be dispensed with.

As mentioned above, the upper springs 14 are not absolutely necessary because the lower springs 14 can be designed and mounted in such a way that they can restore the platens 2a, 2b with sections 1a, 1b or the sections 1a, 1b alone to the normal positions of exact parallelism with each other and with the closing members 3a, 3b as soon as the mold sections are moved away from the plane 7. In many instances, the only function which the springs 14 must perform is to prevent unintentional tilting of mold sections 1a, 1b when the mold is open. It is further clear that the springs 14 may be replaced with other types of biasing means, such as packages of dished springs, pneumatic or hydraulic shock absorbers, gas-filled bellows, dashpots and/or others. Helical springs, dished springs or analogous resilient elements are normally employed when the biasing means must store relatively small amounts of energy; otherwise, a dashpot or a shock absorber may find preference over the biasing means of FIGS. 1 and 2.

An important advantage of the improved mold is that the tie rods 4, 4a are located at a level below the mold sections 1a and 1b. Thus, and assuming that the mold is to be transported (with the tie rods 4, 4a) at right angles to the plane of FIG. 1 between an extruding station where the mold cavity receives a parison which is being continuously extruded from the nozzle of an extrusion machine, the tie rods cannot strike against the growing parison because the mold sections reach the extruding station before the leader of the parison descends to the level of the tie rods. Also, and assuming that the parison which is received in the cavity of the mold is to be converted first into a blank (i.e., into a partially finished hollow article) after the mold has been moved from the extruding station, at right angles to the plane of FIG. 1, and on to a blowing station, the semifinished article can be removed from between the sections 1a, 1b of the opened mold in a direction away from the extruding station. This is possible due to the fact that the tie rods are located below the mold sections. Consequently, a parison can enter the space between the mold sections 1a, 1b at one side of the mold (e.g., from behind, as viewed in FIG. 1), and a semifinished article can be removed from the space between the sections 1a, 1b in a direction toward the observer of FIG. 1. It will be readily appreciated that such mode of operation would not be possible if the tie rods 4, 4a were mounted diagonally opposite each other, e.g., if the tie rod 4 would traverse the upper left-hand portions of the closing members 3a, 3b and the tie rod 4a would traverse the lower right-hand portions of the closing members, or vice versa.

The placing of the rams 10 and pivots 13 behind or close to the centers of the respective mold sections 1a, 1b brings about another important advantage. As shown, the rod 6 for moving the closing member 3b relative to the tie rods 4, 4a is located close to the tie rods. This is desirable because such mounting of the rod 6 reduces the likelihood of jamming of the closing member 3b on the tie rods when the respective motor is set in operation to remove the mold section 1b toward or away from the mold section 1a. Since the mold sections 1a, 1b can pivot relative to the closing members 3a, 3b about horizontal axes, the fact that the closing members are likely to become tilted (i.e., to assume positions shown in FIG. 2 in which they are not parallel to each other), does not influence the accuracy with which the open sides 1A, 1B of the mold sections 1a, 1b abut against each other during expansion of a parison in the mold cavity. Moreover, and as explained before, the placing of the means for moving the tie rods 4, 4a and of the means for moving the closing member 3b at a substantial distance from the center of gravity of the composite body including the mold sections 1a, 1b does not prevent the closing members from applying a desirable and often very substantial locking and sealing force so as to prevent even partial opening of the mold during conversion of a parison into a semifinished blank or immediately into a finished hollow shaped article.

Figure 3:
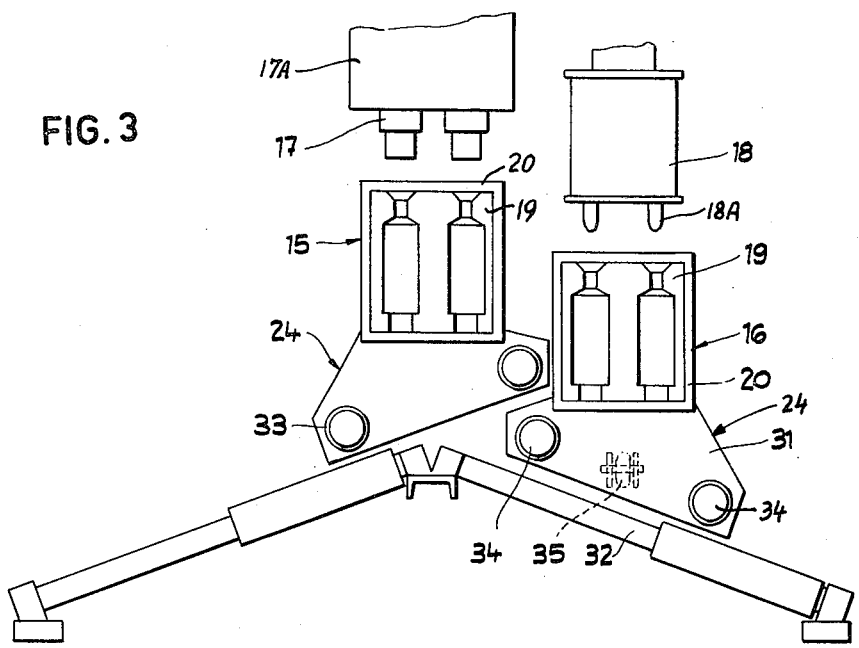
FIG. 3 is a schematic end elevational view of one-half of a group of two modified open-and-shut molds.
Figure 4:
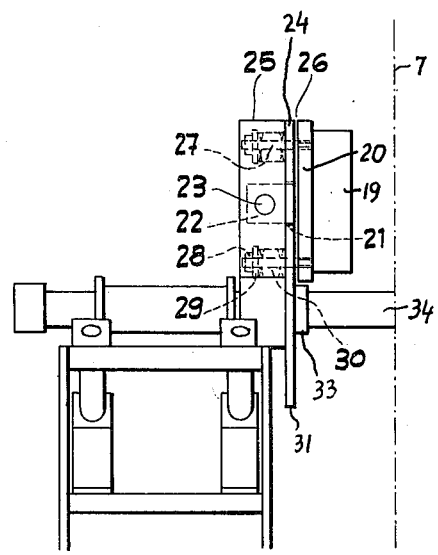
FIG. 4 is a fragmentary side elevational view with one of the molds of FIG. 3 shown in closed position.

FIGS. 3 and 4 illustrate a portion of a blow molding machine with two open-and-shut molds 15 and 16 which constitute slight modifications of the mold shown in FIGS. 1 and 2. Each of the two molds has two sections 19 mounted on discrete platens 20. As shown in FIG. 3, the open side of each of the illustrated mold sections 19 has two recesses in the form of half cavities so that, when the mold 15 or 16 is closed, it can be used for simultaneous conversion of several discrete parisons into several discrete semifinished hollow shaped articles or into several discrete finished hollow shaped articles. The molds 15, 16 can alternately receive pairs of parisons at an extruding station accommodating an extrusion machine 17A with two parallel extrusion nozzles 17. The parisons which are received in the cavities of the mold 16 are thereupon expanded by two blowing mandrels 18A forming part of a blowing unit 18. A similar blowing unit (not shown) cooperates with the mold 15 when the latter contains two freshly extruded parisons and is moved to the left, as viewed in FIG. 3, so as to move the two mold cavities therein into register with the blowing mandrels of the second blowing unit. However, the machine of FIGS. 3 and 4 can also be designated to use a single extrusion machine 17A and a single blowing unit 18, depending on the manner in which the molds 15, 16 are movable sideways, i.e., in the plane of FIG. 3. The blowing machine which is shown in FIGS. 3 and 4 is similar to the machine disclosed in German printed publication No. 1,479,449 to which reference may be had if necessary.

When the mold 15 is located below the extrusion machine 17A to receive two freshly extruded parisons from the nozzles 17, the mold 15 is located below the blowing unit 18 so that the mandrels 18A can expand the parisons which are confined in the two cavities of the mold 16. The mold 15 then moves into register with the associated blowing unit while the modl 16 moves into register with the extrusion machine 17A to receive two fresh parisons. It is clear that the mold 16 must open and be relieved of the two freshly formed hollow shaped articles therein before it reaches the extruding station. If the molds 15 and 16 are designed to form semifinished products or blanks (i.e., shaped articles which are not as yet fully expanded to assume the form of finished bottles, cans, vials or the like), the blow molding machine comprises two additional molds which receive semifinished articles from the molds 15, 16 and cooperate with suitable blowing units to complete the conversion of parisons into shaped articles of predetermined size and shape. For the sake of clarity, the nozzles 17 and mandrels 18A of FIG. 3 are shown in raised positions.

The mold sections 19 are separably but rigidly secured to the respective platens 20, and these plates are articulately connected with upright walls 25 on the respective closing and sealing members 24. The walls 25 are preferably provided in pairs and are rigid with the outer or rear sides of the respective closing members 24, i.e., with those sides which face away from the associated platens 20. Each platen 20 has a rearwardly extending projection or ram 22 which extends with clearance through an opening 21 of the adjacent closing member 24 and is articulately connected to the corresponding pair of walls 25 by a horizontal pivot pin 23. When the mold 15 or 16 is open, a small clearance a gap 26 exists between the rear side of each platen 20 and the adjacent closing member 24.

The means for biasing the platens 20 into exact parallelism with the adjacent closing members 24 comprises two or more packages of dished springs 30 which are located behind the closing members 24 and surround bolts 27 threadedly connected with the respective platens 20 and extending with clearance through openings or holes provided therefor in the respective closing members 24. Each bolt 27 carries at its rear end a retainer or washer 29 and meshes wth a nut 28 which can be rotated to change the initial stressing of the respective package 30. Each of the packages 30 reacts against the adjacent washer 29 and bears against the rear side of the respective closing member 24. These packages can be replaced by helical springs or by any of the aforediscussed equivalent biasing means.

The lower portion 31 of each closing member 24 is enlarged to form a base or foot having therein two guide sleeves 33 for pairs of tie rods 34. The tie rods 34 are normal to the plane of FIG. 3 and the lower edge faces of the portions 31 are parallel to the means 32 along which the closing plates 24 are guided to move with the respective molds 15, 16 into and from register with the nozzles 17. FIG. 3 shows that the tie rods 34 are spaced apart so that the respective pairs of mold sections 19 are located therebetween. Also, the tie rods 34 are located at levels below the respective pair of mold sections 19 and are disposed at different levels. The reference character 35 denotes in FIG. 3 a rod (e.g., a piston rod) forming part of a mechanism which can move the two sections 19 of the mold 16 with and relative to the respective tie rods 34 to thereby open or close the mold 16. A similar mechanism is provided to move the sections of the mold 15.

An important advantage of molds which employ only one pair of tie rods and wherein the tie rods are located at a level below the mold sections is that neither of the two molds can interfere with movements of the other mold toward and away from the extruding or blowing station. This is clearly shown in FIG. 3.

Due to the fact that the tie axes of the rods 34 of the mold 15 or 16 are not located in a common horizontal plane, the deformation or displacement of closing members 24 with respect to the corresponding platens 20 is much more complex than in the embodiment of FIGS. 1 and 2 wherein the closing members 3a, 3b merely tilt or tend to tilt about axes which are parallel to the lower edges 8 of the mold sections 1a, 1b. In the molds 15 and 16, the closing members 24 are actually twisted in space because they tend to pivot with respect to two tie rods which are located at different levels. However, even such complex deformation or displacement of closing members 24 relative to the respective platens 20 does not affect the accuracy of face-to-face abutment of the open sides of mold sections 19 against each other when the mold 15 or 16 is closed. This is attributed to the provision of means 21, 22, 23, 25 for articulately connecting each platen 20 to the respective closing member 24. The likelihood of misalignment of mold sections 19 in each of the molds 15, 16 when the molds are closed and sealed can be further reduced if the means for articulately connecting the platens or mold sections to the respective closing members comprises suitable universal joints (e.g., ball and socket joints, Kardanic joints and/or others). Such universal joints can be used with equal advantage in the mold of FIGS. 1 and 2 as substitutes for the parts 10–13.

The mold of FIGS. 1–2 or the molds of FIGS. 3–4 can use two or more different biasing means. For example, the helical springs 14 of FIGS. 1–2 can be used in addition to or as a substitute for the dished springs 30 of FIG. 4, or vice versa. Also, such springs can be used in combination with more complex biasing means, such as the aforementioned shock absorbers, gas-filled bellows and/or others. As mentioned before, helical or dished springs will normally be employed when the biasing means must store relatively small amounts of energy.

An important advantage of the improved molds is that they insure a proper sealing of the mold cavity or cavities even if the closing members are caused to apply to the respective mold sections a very pronounced closing, sealing and locking force. Moreover, the sections of the open mold can readily approach one or more persons at the extruding station or move apart to release a finished shaped article or a semifinished article at the blowing station. This is attributed to a number of factors, such as the use of tie rods which are located at a level below the mold sections so that they do not strike against one or more parisons which issue from one or more nozzles at the extruding station while an open mold moves toward the nozzle or nozzles, and also to the fact that the tie rods are spaced apart a distance exceeding the width of the mold sections. Still further, the sections of the improved mold are more readily accessible for inspection or detachment from the respective platens or closing members than the sections in a mold using tie rods which are installed in part above and in part below the mold sections, even in a mold using only two tie rods which are located diametrically opposite each other above and below the mold sections. Access to the mold sections is desirable for many reasons, for example, to remove remnants of hardened synthetic thermoplastic material, to examine the open sides of the mold sections, and/or others. Also, the placing of all tie rods at a level below the mold sections allows for more rapid attachment of fresh mold sections.

Without further analysis, the foregoing will so fully reveal the gist of the present invention that others can, by applying current knowledge, readily adapt it for various applications without omitting features which farily constitute essential characteristics of the generic or specific aspects of my contribution to the art and, therefore, such adaptations should and are intended to be comprehended within the meaning and range of equivalence of the claims.

What is claimed as new and desired to be protected by Letters Patent is set forth in the appended claims:

1. An open-and-shut mold, particularly for use in blow-molding machines, comprising two upright closing members each having an upper portion, a lower portion, and an opening; substantially horizontally oriented parallel tie rods extending between said lower portions, at least one of said lower portions being movable together with and lengthwise of said tie rods; two mold sections having open sides facing each other; means articulately connecting each of said mold sections to said upper portion of one of said closing members in vertically spaced relationship to said tie rods, including elements rigid with said mold sections and extending with clearance through the openings of the respective closing members, and pivots articulately connecting said elements to the respective closing members; and means for moving at least one of said closing members to thereby shift the respective mold sections in said vertically spaced relationship between first and second positions in which said open sides respectively abut and are spaced from one another.

2. An open-and-shut mold as defined in claim 1, wherein said tie rods include a first and a second tie rod, said first and second tie rods being spaced apart from each other and said mold sections being disposed in the space between said tie rods.

3. An open-and-shut mold as defined in claim 1, further comprising a pair of platens, each of said platens being located between one of said mold sections and the respective closing member and each of said platens being rigid with the adjacent mold section.

4. An open-and-shut mold as defined in claim 1, wherein the axes of said tie rods are located in a common horizontal plane.

5. An open-and-shut mold as defined in claim 1, further comprising biasing means interposed between each of said closing members and the respective mold section.

6. An open-and-shut mold as defined in claim 1, wherein said pivots comprise pivot members whose axes are normal to the axes of said tie rods.

7. An open-and-shut mold as defined in claim 1, wherein said lower end portions are enlarged and said tie rods extend through said lower end portions.

8. An open-and-shut mold as defined in claim 1, wherein one of said closing members is rigid with said tie rods and the other closing member is slidable along said tie rods, said means for moving comprising means for reciprocating said tie rods and means for simultaneosly reciprocating said other closing member with respect to said tie rods.

9. An open-and-shut mold as defined in claim 8, wherein said means for reciprocating comprise fluid-operated motors.

10. An open-and-shut mold as defined in claim 1, wherein said tie rods are each located in a different horizontal plane.

11. An open-and-shut mold, particularly for use in blow-molding machines, comprising two upright closing members each having an upper portion, a lower portion, and an opening; substantially horizontally oriented parallel tie rods extending between said lower portions, at least one of said lower portions being movable together with and lengthwise of said tie rods; two mold sections having open sides facing each other; means articulately connecting each of said mold sections to said upper portion of one of said closing members in vertically spaced relationship to said tie rods, including rams rigid with said mold sections and extending with clearance through the openings of the respective closing members, and pivots articulately connecting said rams to the respective closing members; and means for moving at least one of said closing members to thereby shift the respective mold sections in said vertically spaced relationship between first and second positions in which said open sides respectively abut and are spaced from one another.

12. An open-and-shut mold as defined in claim 11, wherein each of said closing members has a side which faces towards and another side which faces away from the respective mold section, each of said closing members having a support at said other side, and said pivots connecting said rams to the respective supports.

13. An open-and-shut mold, particularly for use in blow-molding machines, comprising two upright closing members each having an upper portion and a lower portion; substantially horizontally oriented parallel tie rods extending between said lower portions, at least one of said lower portions being movable together with and lengthwise of said tie rods; two mold sections having open sides facing one another; means articulately connecting each of said mold sections to said upper portion of one of said closing members in vertically spaced relationship to said tie rods, comprising a pivot member mounted on each of said closing members and articulately supporting the respective mold section; biasing means interposed between said mold sections and the respective closing members below and vertically spaced from said pivot member; and means for moving at least one of said closing members to thereby shift the respective mold sections in said vertically spaced relationship between first and second positions in which said open sides respectively abut and are spaced from one another.

14. An open-and-shut mold as defined in claim 13, further comprising additional biasing means interposed between said closing members and the respective mold sections in vertically spaced relationship above said pivot members.

15. An open-and-shut mold, particularly for use in blow-molding machines, comprising two upright closing members each having an upper portion and a lower portion; substantially horizontally oriented parallel tie rods extending between said lower portions, at least one of said lower portions being movable together with and lengthwise of said tie rods; two mold sections having open sides facing one another; means articulately connecting each of said mold sections to said upper portion of one of said closing members in vertically spaced relationship to said tie rods, comprising a pivot member mounted on each of said closing members and articulately supporting the respective mold section; biasing means below and vertically spaced from the respective pivot member for biasing the respective mold section so as to maintain said open sides in parallelism with one another when said open sides are spaced apart; and means for moving at least one of said closing members to thereby shift the respective mold sections in said vertically spaced relationship between first and second positions in which said open sides respectively abut and are spaced from one another.

* * * * *